US006969735B1

(12) United States Patent
Godwin

(10) Patent No.: US 6,969,735 B1
(45) Date of Patent: *Nov. 29, 2005

(54) PLASTICIZERS FROM LESS BRANCHED DECYL ALCOHOLS

(75) Inventor: Allen David Godwin, Seabrook, TX (US)

(73) Assignee: ExxonMobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/855,105

(22) Filed: May 23, 2004

(51) Int. Cl.$^7$ .......................... C08K 5/09; C08K 5/12; B32B 15/00; D02G 3/00
(52) U.S. Cl. ....................... 524/296; 524/141; 524/295; 524/297; 524/298; 428/379
(58) Field of Search ............................. 524/296, 298, 524/141, 295, 297; 428/379

(56) References Cited

U.S. PATENT DOCUMENTS

| | | | |
|---|---|---|---|
| 2,842,514 A | 7/1958 | Bartlett et al. ............. 260/31.6 |
| 4,426,542 A | 1/1984 | Barker et al. ............... 568/883 |
| 4,806,425 A | 2/1989 | Chu-Ba ....................... 428/379 |
| 4,969,953 A * | 11/1990 | Miyazawa et al. ........... 106/311 |
| 5,189,105 A | 2/1993 | Miyazawa et al. ..... 252/182.12 |
| 5,268,514 A | 12/1993 | Bahrmann et al. .......... 568/882 |
| 5,369,162 A | 11/1994 | Bahrmann et al. .......... 524/296 |
| 5,382,716 A | 1/1995 | Bahrmann et al. .......... 568/883 |
| 5,414,160 A | 5/1995 | Sato et al. .................. 568/883 |
| 5,439,742 A * | 8/1995 | Baker et al. ................ 428/389 |
| 5,462,354 A * | 10/1995 | Neier ......................... 366/314 |
| 5,462,986 A | 10/1995 | Bahrmann et al. .......... 524/296 |
| 5,463,147 A | 10/1995 | Bahrmann et al. .......... 568/882 |
| 5,468,419 A | 11/1995 | Miyazawa et al. ..... 252/182.12 |
| 5,516,948 A | 5/1996 | Bahrmann et al. .......... 568/882 |
| 5,583,250 A | 12/1996 | Bahrmann et al. ............ 560/76 |
| 5,661,204 A | 8/1997 | Bahrmann et al. .......... 524/296 |
| 6,355,711 B1 | 3/2002 | Godwin et al. ............. 524/285 |
| 6,437,170 B1 | 8/2002 | Thil et al. ..................... 560/76 |
| 6,482,972 B1 | 11/2002 | Bahrmann et al. ............ 560/76 |
| 2004/0138386 A1 * | 7/2004 | Kumaki et al. ........... 525/334.1 |
| 2005/0020718 A1 * | 1/2005 | Gosse et al. ................. 523/105 |

FOREIGN PATENT DOCUMENTS

| | | | |
|---|---|---|---|
| EP | 0094456 | 5/1986 | ........... C07C 29/16 |
| EP | 0 603 630 | 7/1993 | ........... C07C 29/17 |
| JP | 1992-48106 | 2/1992 | .......... H01Q 13/08 |
| JP | 1992-349703 | 12/1992 | .......... H01Q 13/08 |
| JP | 1993-271326 | 10/1993 | ............. C08F 8/04 |

OTHER PUBLICATIONS

"Encyclopedia of Polymer Science and Technology", 2002, by John Wiley & Sons, Inc., Plasticizers, 5. Trimellitate Esters.*

"Plasticizers," A.D. Godwin, in Applied Polymer Science 21$^{st}$ Century, edited by C.D. Craver and C. E. Carraher, Elsevier (2000); pp. 157-175.

L.G. Krauskopf, "Handbook of PVC Formulations," edited by E.J. Wickson, "Monomeric Plasticizers," 1993, John Wiley & Sons, p. 201.

U.S. Appl. No. 10/462,354, filed Jun. 11, 2003, Godwin et al.

Encyclopedia of Chemical Technology, Kirth-Othmer, vol. 18, 3$^{rd}$ Edition, John Wiley & Sons, New York, pp. 111-183 (1982).

* cited by examiner

Primary Examiner—David W. Wu
Assistant Examiner—Mei Q. Huang
(74) Attorney, Agent, or Firm—Andrew B. Griffis

(57) ABSTRACT

Less branched $C_{10}$ alcohols are used to provide plasticizer esters particularly suitable for high temperature applications such as wire and cable insulation.

21 Claims, No Drawings

PLASTICIZERS FROM LESS BRANCHED DECYL ALCOHOLS

FIELD OF THE INVENTION

The invention relates to plasticizers based on less branched $C_{10}$ alcohols. In an embodiment, the invention relates to less volatile plasticizers based on less branched $C_{10}$ alcohols particularly suitable for use in PVC resin.

BACKGROUND OF THE INVENTION

Plasticizers are incorporated into a resin (usually a plastic or elastomer) to increase the flexibility, workability, or distensibility of the resin. The largest use of plasticizers is in the production of "plasticized" or flexible polyvinyl chloride (PVC) products. Typical uses of plasticized PVC include films, sheets, tubing, coated fabrics, wire and cable insulation and jacketing, flooring materials such as vinyl sheet flooring or vinyl floor tiles, adhesives, sealants, inks, and medical products such as blood bags and tubing, and the like.

Other polymer systems that use small amounts of plasticizers include polyvinyl butyral, acrylic polymers, poly (vinyldiene chloride), nylon, polyolefins, and certain fluoroplastics. Plasticizers can also be used with rubber (although often these materials fall under the definition of extenders for rubber rather than plasticizers). A listing of the major plasticizers and their compatibilities with different polymer systems is provided in "Plasticizers," A. D. Godwin, in *Applied Polymer Science 21st Century*, edited by C. D. Craver and C. E. Carraher, Elsevier (2000); pp. 157–175.

Plasticizers can be characterized on the basis of their chemical structure. The most important chemical class of plasticizers are phthalic acid esters, which accounted for about 85% worldwide of PVC plasticizer usage in 2002. Two other important chemical classes are adipic acid esters, and trimellitic acid esters. Di- and tri-esters of these aforementioned acids, having a molecular weight range from about 300 to 600, typically offer a balance of solvency and compatibility with the resin, yielding plasticized materials with useful properties and good aging abilities.

Trimellitate esters are used as PVC plasticizers in those applications where greater permanence is required. These esters are similar in structure to the phthalic acid esters, except for having a third ester functionality on the aromatic ring. Trimellitate esters provide for greater permanence primarily from reduced volatility losses and offer reduced losses attributed to lower migration rates into other materials. Plasticized PVC products prepared from either tri-2-ethylhexyl trimellitate (TOTM) or the even more permanent plasticizer triisononyl trimellitate (TINTM) will survive longer periods of high temperature service versus those products prepared from more volatile phthalate plasticizers currently available. However, the trimellitate esters are generally much more expensive, typically costing 2–3 times that of the phthalate esters such as DEHP (di-2-ethylhexyl phthalate) or DINP (diisononyl phthalate) and yield more expensive plasticized PVC products. PVC formulations using trimellitate plasticizers are also more difficult to process when compared with PVC formulations that use only phthalate esters as plasticizers.

Plasticizer selection for electrical wire insulation is dependent upon the performance specifications of the insulation material and the jacketing. Performance specifications and tests such as accelerated aging tests (at various temperatures), and the like are well known in this art and are described by UL (Underwriters Laboratory) methods, e.g., as in the standard UL 83. For example, for those products designed for extended periods of use at 90° C. or 105° C., often evaluated in accelerated oven aging studies for seven (7) days at 136° C., will contain primarily the more costly trimellitate plasticizers. A typical formulation for this 90° C. or 105° C. rated product which must pass the 136° C. aging requirement by maintaining a minimum retention of tensile properties, is shown in Table 1, column A. (European designations are different from those used in the United States. For instance, 105° C. designations according to VDE Specification Code 0207 are YI 8 and YM 4).

On the other hand, flexible PVC insulation designed for extended periods of use at 60° C., characterized by accelerated oven aging testing at 80° C. or 100° C., can be prepared from less costly, easier to process plasticizers such as DINP and do not need the more expensive and difficult to process trimellitate esters. A typical formulation for this 60° C. rated product is shown in Table 1, column B.

Flexible PVC compounds prepared with trimellitate esters such as TOTM or TINTM as the sole plasticizer system, generally exceed the minimum retained properties after aging specification for 90° C. or 105° C. electrified wire insulation compounds, such as those required to meet the 105° C. Class 12 (UL62), 105° C. Appliance (UL758), NM-B 90° C. building wire (Romex®, non-metallic sheathed cable, PVC jacket), or THHN 90° C. building wire (thermoplastic PVC insulation, high heat resistant, 90° C. rating, dry or damp, nylon jacket), while those products prepared with only the lower cost phthalate esters fail.

It is a common practice to partially substitute some of the expensive trimellitate esters with less expensive, higher molecular weight phthalate esters. As the concentration of phthalate ester in the plasticizer system increases, performance in the accelerated aging test will decrease, but there is enough flexibility in this formulating to offer a measurable cost savings while still meeting the product performance requirements.

An example of this use of trimellitate plasticizer blended with a heavier molecular plasticizer is the formulation described by L. G. Krauskopf, "Handbook of PVC Formulations," edited by E. J. Wickson, "Monomeric Plasticizers," 1993, John Wiley & Sons, page 201, which describes for UL method 83 THHN applications, an insulation material prepared using the formulation shown in Table 1, column C. "UDP" is undecyl dodecyl phthalate (Jayflex™ UDP, available commercially, as are all Jayflex™ plasticizers cited herein, from ExxonMobil Chemical Company, Houston, Tex.). The stabilizer used is Dythal™ lead stabilizer, available commercially as a phthalate or sulfate salt. According to this reference, the formulation exhibited 72% retained elongation after aging for seven (7) days at 136° C., exceeding the minimum specification of 65% retained elongation.

TABLE 1

| A | B | C |
|---|---|---|
| 100 kg PVC resin | 100 kg PVC | 100 kg PVC |
| 45 kg TOTM | | 25 kg TINTM |
| | 60 kg DINP | 25 kg UDP |
| 20 kg CaCO₃ or clay | 50 kg calcium carbonate | 12 kg calcined clay |
| 6 kg lead stabilizer | 5 kg lead stabilizer | 6 kg lead stabilizer |
| 4 kg antimony trioxide | 4 kg antimony trioxide | 4 kg antimony trioxide |

TABLE 1-continued

| A | B | C |
|---|---|---|
| 0.25 kg stearic acid | 0.25 kg stearic acid | 0.2 kg stearic acid |

Other phthalates commonly blended with trimellitate esters to reduce costs while exceeding specification are diundecyl phthalate (DUP, also available commercially as Jayflex™ L11P), and ditridecyl phthalate (DTDP, available commercially as Jayflex™ DTDP).

The blending of phthalate esters with trimellitate esters to make PVC insulation compounds also contributes to improved processability by reducing the melt viscosity of the flexible PVC compound. In the preparations of PVC compounds for high temperature applications, it is preferable to use as much phthalate ester as possible in the plasticizer mixture, to help reduce costs and improve processability. Phthalate plasticizers blended with trimellitate esters also yield reductions in dry blending times, which also improves the processability of PVC composition.

However, because of the higher volatility of the phthalate esters relative the volatility of the trimellitate esters, there are practical limitations in the type and level of phthalate esters which cannot be exceeded, for at higher phthalate levels the products begin to fail the retained tensile properties listed in the various specifications. For example, current blends of TOTM with DUP are limited to about 40 wt. % DUP as the maximum level of the phthalate esters because at higher phthalate ester levels, product failures start to occur in retained elongation and retained tensile properties after accelerated aging. For this reason it is common to find commercial products with only 20 wt. % to 40 wt. % DUP in blends with TOTM to avoid product failures. As Jayflex™ DTDP has slightly lower volatility than DUP, it can be used in higher concentrations, replacing higher levels of trimellitate esters. However, it is still limited to about a 60 wt. % concentration in blends with the heavier molecular weight TINTM plasticizer, with more typical concentrations being around 50 wt. % DTDP in TINTM. In other trimellitate esters with higher volatility such as trioctyl trimellitate (TOTM), DTDP is limited to 50 wt. % or less.

In addition to the aforementioned problems, there is also a need for alternative plasticisers to avoid problems with migration out of the plasticized material. Plasticizers with improved compatibility with the PVC resin will migrate less into other systems while plasticizers with poor compatibility can migrate readily.

Important properties of a plasticizer for electrical insulation products include without limitation high plasticizing efficiency, excellent compatibility with the resin, excellent processability, excellent oxidative stability, very low conductivity, and low volatility. Usually, when changes are made to improve one of these properties, some other important property is adversely affected. For example, an increase in alcohol molecular weight tends to reduce volatility at the expense of plasticizing efficiency. In addition, as the molecular weight of the phthalate or trimellitate ester plasticizer increases, its compatability with PVC decreases, eventually resulting in a less desirable flexible PVC product with limited potential.

The range of alcohols useful in esterification for phthalate ester plasticizers is generally limited from about $C_4$ to about $C_{13}$ monohydridic alcohols. It is known that the specific alcohols from which the esters are made influences the performance properties, e.g., the size and structure of the alkyl group helps determine the volatility and gellation temperature of the plasticisers and is therefore chosen according to the application in which the plasticized polyvinyl chloride is to be used. The alcohols from which the plasticisers esters are made are generally obtained by either olefin oligomerization followed by hydroformylation or by hydroformylation of olefins to form aldehydes followed by aldehyde dimerization, generally through an aldol reaction. The alkyl groups of the esters therefore vary in size and structure according to the process used to produce the alcohols.

U.S. Pat. No. 2,842,514 describes using alcohol mixtures obtained by the reaction of aldehydes obtained by the "Oxo" process, wherein an olefin feed is oxonated with carbon monoxide and hydrogen at elevated temperature and pressure in the presence of a cobalt catalyst. Particularly effective plasticizers are said to derive from certain polyhydric alcohols derived from the Oxo process esterified with $C_5$–$C_7$ saturated aliphatic acids.

U.S. Pat. No. 4,426,542 describes a process in which mixed butenes are converted to a $C_{10}$ plasticizer alcohol for phthalate esters comprised of at least about 80–90% 2-propyl-heptanol by an oxo reaction. It is taught, for instance, that 2-propylheptanol is a well-suited plasticizer alcohol whereas 2-propyl-4-methyl-hexanol has much poorer properties. This patent teaches to moderate the temperature in the hydroformylation reaction to achieve a higher ratio of normal versus branched product, the former being more desirable.

U.S. Pat. No. 4,806,425 describes the use of electrical wiring products based on dialkyl phthalate esters having at least 11 carbon atoms ($C_{11}$) in the alkyl groups and having a "higher than normal amount of antioxidant." Adding more antioxidant is not a preferred solution to the problem of getting higher phthalate blends because increased antioxidant can lead to decreases in volume resistively and can cause problems with color stability, as well as adding costs.

U.S. Pat. Nos. 5,189,105 and 5,468,419 are directed to obtaining a $C_9$ plasticizer alcohols with good cold resistance and electrical insulating properties, obtained by hydroformylating octenes derived from butene dimerization. The desired product is generally obtained by taking selected portions of the alcohol mixture obtained after conventional hydroformylation.

U.S. Pat. Nos. 5,268,514; 5,369,162; 5,382,716; 5,462,986; and 5,463,147 describe mixtures of isomeric decyl alcohols obtained by hydroformylation of 1- and 2-butene containing mixtures to obtained linear or "slightly branched chain alcohols." Phthalate esters obtained using these decyl alcohols are taught to be useful in PVC compositions, having particularly good "cold resistance."

U.S. Pat. No. 5,414,160 is concerned with an organonickel catalyst system capable of improving the yield and selectivity of octenes having a low degree of branching. The average degree of branching of the octenes is from 0.85 to 1.15. Plasticizer $C_9$ alcohols are obtained after hydroformylation of the thus-described octenes.

U.S. Pat. Nos. 5,516,948; 5,583,250; and 5,661,204 describe mixture of isomeric decyl alcohols obtained by oligomerization of propylene in the presence of deactivated zeolites as catalyst, followed by separation of the $C_9$ olefins from the oligomer mixture, then hydroformylation of the $C_9$ olefins to $C_{10}$ aldehydes, followed by hydrogenation to the corresponding alcohols. The mixtures are esterified with phthalic acid or anhydride. The alcohol product claimed in the U.S. '250 patent is at least 80% linear.

U.S. Pat. No. 6,355,711 describe a plasticizer ester prepared by esterifying an acid or anhydride with $C_7$–$C_{11}$ oxo alcohols prepared by hydroformylating $C_6$–$C_{10}$ olefins having at least 50% methyl branching at the beta carbon. Examples of this invention are $C_9$ phthalate esters obtained from the $C_9$ alcohol produced by the hydroformylation of 2-methyl-heptene-1 or 2-methyl-heptene-2. They are described by the patent as being useful particularly in the manufacture of PVC automotive interior trim applications, and in electrical wire jacketing compounds, however, the plasticizers discussed are too volatile for certain high-temperature applications, e.g., high temperature electrical wiring.

U.S. Pat. No. 6,437,170 relates to a mixture of isomeric nonanol diesters of adipic or phthalic acid, wherein the alcohol component of the diesters are formed from an isomeric nonanol mixture. The composition is characterized by a specific ratio of methylene groups to methyl groups in the isononyl radical, as measured by $^1H$ NMR spectra, obtainable preferably by butene dimerization using a nickel oxide catalyst followed by hydroformylation.

It is known that as the linearity of the alcohol used to make the phthalate ester increases, certain predictable events occur. One may expect reduced plasticizer volatility, improved plasticizer efficiency towards making PVC flexible, improved low temperature and flexibility, and sometimes improved processability, the latter characteristic being often a combination of plasticizer solvency and plasticizer viscosity. Linearity is usually defined by either a branching index or by the number of branches per alkyl side chain as determined by proton NMR analyses. As the linearity of a plasticizer increases, its compatibility with PVC can decrease, where "compatibility" is used to reference a usable product with no or slight exudation under stress. For trimellitate esters, the most common alcohols used to prepare the ester are $C_7$ through $C_9$ primary alcohols.

Recently, a plasticizer compositions based on less branched $C_{1-3}$ alcohols, in blends with trimellitate esters based on $C_8$ or $C_9$ alcohols was described. See U.S. patent application Ser. No. 10/462,354, filed Jun. 11, 2003. Trimellitate esters of less than $C_6$ in size yield trimellitate esters of too high in volatility to be generally useful for products requiring greater permanence while those made with alcohols of $C_{10}$ and higher carbon numbers usually have long-term compatibility problems. Jayflex™ TINTM, is derived using a $C_8$ olefin obtained from a solid phosphoric acid unit followed by hydroformylation over cobalt in the OXO process. Jayflex™ TINTM has an average 2.0 branches per alcohol moiety and a branching index of 22% (assuming that all branches are methyl branches and that the average carbon number of the alcohol side chains is 9.2). These analyses are usually obtained through a combination of proton NMR, carbon-13 NMR, and gas chromatography methods. Branching index is defined as the ratio of the average number of branches divided by the average carbon number of the alcohol, expressed as a percent.

Additional references of interest include EP 0 094 456; EP Application Nos. 1982-302440; 1982-302440; Japanese Application Nos. 1992-48106; 1992-349703; 1993-271326; and U.S. Pat. No. 6,482,972.

The present inventor has surprisingly discovered, however, that plasticizers based on trimellitate esters having, as the alcohol moiety, less branched $C_{10}$ alcohols provide for at least one of the properties of improved processability of the resin/plasticizer mixture, lower volatility and less emissions during process, and improved aging performance characteristics in articles formed therefrom without significantly effecting the other important properties of the plasticizer, and/or plasticizer/resin mixture, and/or final product.

SUMMARY OF THE INVENTION

The invention is directed to plasticizers based on less-branched $C_{10}$ alcohols, with or without other plasticizing alcohols.

The invention is also directed to PVC resin compositions comprising PVC resin and one or more plasticizers based on less-branched $C_{10}$ alcohols with or without other plasticizers.

Still further, the invention is directed to articles comprising a resin and having incorporated therein plasticizers based on $C_{10}$ mono branched alcohols having 1 branching at the $C_2$ position. The plasticizers according to the present invention are especially useful when incorporated into resins used in high temperature applications such as wire and cable insulation.

The plasticizers according to the invention are based on trimellitate esters having as the alcohol moiety less branched $C_{10}$ alcohols. Less branched alcohols are defined herein as alcohols having an average branchiness of at most 1.6. This means that on average there are no more than 1.6 branches per alcohol molecule. Thus, the alcohol molecule (1):

is a $C_{10}$ alcohol having a branchiness of 1, whereas the molecule (2):

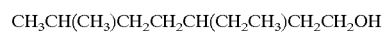

is a $C_{10}$ alcohol having a branchiness of 2; the average branchiness of a mixture containing 50% of (1) and 50% of (2) is 1.5 (percentages based on number of alcohol molecules in the mixture). In a preferred embodiment, the $C_{10}$ alcohols have an average of from 0.5 to 1.6 branches per molecule, more preferably 0.8 to 1.5, still more preferably 0.9 to 1.3. The structures of (1) and (2) are not intended to be limiting, particularly with regard to location of the branches or of the —OH moiety on the chain, but rather are merely illustrative of the definition of branchiness as used according to the present invention.

In an embodiment the plasticizer systems used to prepare flexible polyvinyl chloride (PVC) products for high temperature useful service, such as insulation compounds for 90° C. or 105° C., are based upon mixtures of less branched $C_{10}$ trimellitate esters with lower cost and faster processing phthalate ester plasticizers such as Jayflex™ DTDP (ditridecyl phthalate), Jayflex™ DIDP (diisodecyl phthalate), di-2-propylheptyl phthalate, isodecyl isotridecyl phthalate, 2-propylheptyl isotridecyl phthalate, diundecyl phthalate (available as DUP or as Jayflex™ L11P) or isoundecyl isododecyl phthalate (available as Jayflex™ UDP), where the less branch trimellitate ester is prepared by the reaction of less branched $C_{10}$ alcohols.

The invention is also directed to trimellitate plasticizing esters based on $C_{10}$ alcohols wherein the $^1H$ or proton NMR spectrum, measured in the solvent CDCl$_3$, the ratio of integrated area of the resonance signals with chemical shifts in the range of from 1.1 to 3.0 ppm, relative to the internal standard TMS (tetramethyl silane), to the integrated area of the resonance signals with chemical shifts in the range of 0.5 to 1.1 ppm, relative to the internal standard TMS, is about 1.00 to 4.00.

In another embodiment, the invention is directed to compositions comprising a resin, such as polyvinyl chloride (PVC), and the less branched $C_{10}$-based plasticizer, with additional plasticizers, fillers such as calcium carbonate or clay, stabilizer systems based on either lead stabilizers or non-lead stabilizers, low flammability additives such as antimony trioxide or zinc borate, antioxidants such as bisphenol A or Topanol CA, lubricants, pigments, and other additives.

The less branched $C_{10}$ alcohols according to the invention may be readily be obtained by one of ordinary skill in the art in possession of the present disclosure without undue experimentation. For instance, hydroformylation of butene to yield mixtures of $C_5$ aldehyldes, with subsequent dimerization results in a mixture of less branched $C_{10}$ alcohols, predominately 2-propyl-heptanol as described in U.S. Pat. No. 4,426,542. While triisodecyl trimellitate (TIDTM) esters of $C_{10}$ branched alcohols, such as a trimellitate prepared from EXXAL™ 10, a isodecyl alcohol available from ExxonMobil Chemical Company, a primary alcohol having a branching number of 2.1 as determined by proton NMR are of limited use in PVC formulations because of high plasticizer viscosity and poor processability, trimellitate esters prepared from a mixtures of less branched $C_{10}$ alcohols and containing predominately 2-propyl heptanol offer low volatility, acceptable processability, when used in blends with phthalate esters.

The invention is also directed to plasticized PVC compositions comprising the less branched $C_{10}$ alcohols having low amounts of antioxidant therein.

Yet another embodiment of the invention includes articles comprising the aforementioned compositions, particularly higher temperature wire and cable insulation.

Thus it is an object of the invention to prepare a plasticizing ester having less branching on the alcohol moiety than that provided by prior art, in order to reduce the amount of higher molecular weight plasticizers required to meet the oven aging specifications in wire and cable insulation PVC compounds. This decrease in the use of trimellitate esters brings the benefits to the flexible PVC formulation, an improvement in the processability of the flexible PVC compound, and improvement in the dry blending time (the time required for the plasticizer to absorb into the PVC resin), an improved electrical resistivity of the insulation compound, and a reduction in the formulation costs, while meeting the volatility and aging requirements.

Another object of the invention is to set forth a plasticizing ester prepared from an isodecyl alcohol such as 2-propyl heptanol more compatible with PVC than the $C_{10}$ trimellitate based on higher branched $C_{10}$ alcohols.

Yet another object of the invention is to provide a lower cost plasticizer system for wire and cable insulation compound, through increased substitution of more expensive trimellitate plasticizers with phthalate ester plasticizers.

These and other objects, features, and advantages will become apparent as reference is made to the following detailed description, preferred embodiments, examples, and appended claims.

DETAILED DESCRIPTION

According to the invention, a trimellitate ester prepared from a less branched $C_{10}$ alcohol, or mixtures thereof, surprisingly offers one or more of the advantages of: reduced or lower volatility, lower viscosity, and improved efficiency as a plasticizer. When used as a resin plasticizer, such as with PVC, it is more permanent and processes more easily and quickly, than other $C_{10}$ trimellitate esters. The lower volatility of the less branched ester allows for blending at higher phthalate ratios while still passing the performance requirements. This allows for less of the higher cost plasticizers, such as the trimellitates, to be used in blends in preparation of flexible PVC compounds. Moreover, it is particularly useful in flexible PVC compounds for high temperature applications such as wire and cable insulation, automotive wire, and appliance wire. In addition, less branching allows for less antioxidant in the final product, and improved flexibility at lower temperatures.

While the less branched $C_{10}$ alcohols according to the invention may be esterified with numerous acids and acid anhydrides, such as phthalic and adipic acids or anhydrides, it is particularly useful esterified with trimellitic anhydride to make less-branched $C_{10}$ trimellitate. In an embodiment, these less branched, lower volatile $C_{10}$ trimellitate plasticizers are prepared through esterification of trimellitic anhydride with alcohols prepared by the hydroformylation of corresponding less branched $C_9$ olefins. In yet a more preferred embodiment the less branched $C_{10}$ alcohol is prepared by the aldolization from $C_5$ aldehydes, which are prepared by the hydroformylation of butenes.

In an embodiment, the plasticizing esters according to the present invention are based on a mixture of alcohols comprising less branched $C_8$–$C_{10}$ alcohols. These plasticizing esters are derived from the esterification of acids and/or acid anhydrides with alcohols having a low amount of branching.

The alcohols according to the present invention are preferably derived from the well-known "Oxo" process, wherein compounds containing olefinic unsaturation (hereinafter "olefinic material") are contacted with synthesis gas in the presence of a hydroformylation catalyst, resulting in the formation of a product comprising an aldehyde which has one more carbon atom in its molecular structure than the starting olefinic material. The aldehydes are then dimerized under aldolization conditions to yield a $C_{10}$ product. Subsequent hydrogenation and separation (by, for instance, distillation) yields the desired alcohol. Thus, for instance, a feedstream comprising a $C_4$-containing olefinic material will ultimately produce a product comprising a $C_{10}$ alcohol. The prior art is replete with descriptions of the Oxo process per se, as mentioned above. See, for instance, U.S. Pat. Nos., 5,268,514; 5,369,162; 5,382,716; and 5,463,147.

In a preferred embodiment, the plasticizer is comprised of a ester wherein in the $^1$H NMR spectrum, measured in the solvent $CDC_{13}$, the ratio of integrated area of the resonance signals with chemical shifts in the range from 1.1 to 3.0 ppm to the integrated area of the resonance signals with chemical shifts in the range of 0.5 to 1.1 ppm, wherein the chemical shift in ppm is measured relative to the internal standard TMS, is between 1.20 and 3.50. In a more preferred embodiment this aforementioned ratio is from about 2.0 to about 3.0. It has been found that at higher ratios, the processability improves, the volatility decreases, and the flexibility at law temperature improves. The NMR techniques are standard analytical procedures, such as described in High Resolution NMR Techniques in Organic Chemistry by Timothy D. W. Claridge, Pergamon Press, December 1999, and also in the aforementioned U.S. Pat. No. 6,437,170.

The branched plasticizer TIDTM is produced by the esterification of trimellitic anhydride with a branched $C_{10}$ alcohol. This alcohol also contains lesser amounts of $C_9$ and $C_{11}$ alcohols and is produced by the hydroformylation via the Oxo process from "nonene," a generic name given to the predominately $C_9$ olefinic material obtained by oligimerization of $C_3$ or $C_4$ or $C_5$ olefins in a solid phosphoric acid (or "SPA") unit described above. This alcohol can be characterized by $^1$H NMR and by $^{13}$C NMR as shown in Table 2 below. Table 2 is a comparison of a prior art isodecyl alcohol with a preferred less branched isodecyl alcohol according to the present invention, as described in more detail below.

TABLE 2

Comparison of $C_{10}$ alcohols

| Product | Exxal ™ 10 alcohol | Less branched $C_{10}$ alcohol |
|---|---|---|
| $^1$H NMR Results for alcohol | | |
| Average Carbon number | 9.2 | 10.0 |
| Average branches per molecule | 2.1 | 1.0 |
| 13C NMR Results for alcohol | | |
| First Branch position, % | | |
| 2 | 8.4 | >98 |
| 3 | 28.2 | |
| 3,4 disubstituted | 14.5 | |
| 4 | 27.3 | |
| 5,5+ | 21.6 | |
| Number of quarternary branches/molecule | 0.3 | <0.1 |

It is preferred that the trimellitate esters are based on mixtures of less branched $C_{10}$ alcohols containing predominately 2-propyl-1-heptanol, blended with phthalate esters. The term "predominately" as used herein means that the specified isomer is present to a greater extent than any other isomer. These $C_{10}$ trimellitate esters are prepared from alcohols which are produced by the hydroformylation of butene or mixed butene composition of butene-1, butene-2, and isobutene, followed by dimerization of the resulting $C_5$ aldehydes, then hydrogenation and distillation to yield a mixture of less branched $C_{10}$ alcohols, as described in U.S. Pat. No. 4,426,542. These alcohols may contain from 60–99 wt. % 2-propyl-1-heptanol, with lesser amounts of 4-methyl-2-propyl-1-heptanol, 2-methyl-2-ethyl-1-heptanol, 2-isopropyl-1-heptanol, 5-methyl-2-propyl-1-hexanol, and similar alcohols.

In a preferred embodiment, mixtures of less branched $C_{10}$ trimellitate esters, based on mixtures of less branched alcohols containing greater than 60 wt. % 2-propyl-1-heptanol, with phthalate esters such as DUP, Jayflex™ DTDP, Jayflex™ UDP, Jayflex L11P, Jayflex™ DIDP, di-2-propyl heptyl phthalate, and phthalate coesters made with mixtures of $C_{10}$ to $C_{13}$ alcohols, are used to prepare faster processing and lower cost flexible PVC insulation compounds for high temperature electrical and power cables. Trimellitate esters of less branched $C_{10}$ alcohols offer lower volatility than the less branched $C_9$ trimellitate esters and consequently in formulations, higher phthalate levels can be used.

In an embodiment, the less branched $C_{10}$ alcohols used to prepare the $C_{10}$ trimellitate esters, which is used in blends with phthalate esters, have a branching number of from 0.9 to 1.3 branches per molecule, as determined by standard proton NMR spectroscopy techniques.

Acids and anhydrides which undergo esterification with the alcohols according to the present invention can be any carboxylic acid which undergoes esterification, however, preferably the acid and/or anhydride is trimellitic anhydride.

The esterification process is preferably conducted in the presence of a catalyst. Typical esterification catalysts are titanium, zirconium and tin catalysts such as titanium, zirconium and tin alcoholates, carboxylates and chelates (see, for example, U.S. Pat. No. 3,056,818). Selected acid catalysts may also be used in this esterification process.

Esterification processes are per se well-known, such as described in various references discussed in the Background section above.

Typically, the esterification process according to the present invention comprises (a) adding an excess of an alcohol mixture comprising at least one less branched $C_{10}$ alcohol, and the acid and/or anhydride into a reaction vessel, (b) heating the reaction mixture to a temperature and pressure sufficient to obtain boiling of the reaction mixture, and (c) maintaining the conditions for a time sufficient to converting the acid and/or anhydride and the alcohol to the appropriate ester, e.g., in the most preferred embodiment, a trimellitate ester.

Again it is important to recognize that additional alcohols may be present in the esterification process, such as $C_8$ or $C_{11}$ alcohols. It is preferable that these other alcohols also be less branched alcohols. It is preferred that the plasticizer ester contain at least 50%, more preferably at least 75%, still more preferably at least 90%, most preferably at least 95%, on a molar basis, of the $C_{10}$ according to the present invention.

The aforementioned plasticizer ester according to the present invention, which comprises the reaction product of an acid or anhydride with a $C_{10}$ alcohol having a low number of branching, preferably wherein the branching is limited to propyl branching, may be mixed with other plasticizers. It may be a mixture with phthalate ester plasticizers such as Jayflex DTDP, Jayflex UDP, Jayflex DIDP, Jayflex L11P, or DUP or various phthalate coesters prepared from blends of differing $C_{10}$ and $C_{13}$ OXO alcohols. It may also be a mixture of the less branched $C_{10}$ trimellitate ester with other trimellitate esters such as TOTM or Jayflex TINTM or 79TM. It may also be a mixture of the less branched C10 trimellitate ester of 2-propyl-1-heptanol with phthalate esters or other trimellitate esters. Innumerable variations are possible.

One of the particular advantages afforded by the present invention is that it allows for less use of the more expensive trimellitate esters, and also that less oxidant need be used than might be expected (based on the teachings of the prior art as discussed previously) in meeting the performance requirements for high temperature wire insulation. These and other advantages are illustrated by the following examples.

EXAMPLE

Table 3, below, sets forth the compositions used in the following examples and Table 4, further below, sets forth the results achieved.

Composition A is prepared using Jayflex™ DTDP plasticizer and Jayflex TINTM. The DTDP plasticizer is derived by hydroformylating an $C_{12}$ olefin obtained from a SPA unit, and has a branching number of 3.2. The Jayflex TINTM plasticizer is prepared from $C_9$ alcohols with a branching number of 2.1. This composition is typical of what is used to prepare flexible PVC electrical wire insulation. Although this table illustrates formulations incorporating the phthalate ester Jayflex™ DTDP, similar effects would be observed with the phthalate esters DUP, UDP, DIDP, and other $C_{10}$ and $C_{13}$ phthalate esters and co-esters.

A comparative example is Composition B, a flexible PVC composition prepared using reduced amounts of the higher molecular weight TINTM prepared with $C_9$ alcohols having a branching number of 2.1 plasticizer according to the present invention. Composition B is included to show the effects of reduced amounts of the higher branched trimellitate ester Jayflex™ TINTM when replaced by the less expensive phthalate plasticizer Jayflex™ DTDP. While Composition A passes the required retention of elongation after aging at 136 C for 7 days, Composition B fails this test.

Composition C illustrates the primary facet of this invention. The less branched TIDTM can be replaced by higher amounts of plasticizers. Comparison of Composition C to Composition B illustrates that composition C offers yet even additional advantage over Composition A in further reduction in the use of the expensive, poor processing trimellitate esters.

TABLE 3

|  | A | B | C |
|---|---|---|---|
| PVC[1] | 100 parts | 100 parts | 100 parts |
| Jayflex ® TINTM | 20 | 10 |  |
| Jayflex ® DTDP | 30 | 40 | 43 |
| Less Branched TIDTM according to the invention | 0 | 0 | 7 |
| $CaCO_3$ | 12 | 12 | 12 |
| SP-33 clay[2] | 10 | 10 | 10 |
| Lead stabilizer[3] | 6 | 6 | 6 |
| Stearic Acid | 0.25 | 0.25 | 0.25 |
| $Sb_2O_3$ | 3 | 3 | 3 |
| Antioxidant TCA (TOPANOL CA[4]) | 0.2 | 0.2 | 0.1 |
| Processability | Marginal | Marginal | Very Good |
| Compatibility | Good | Good | Good |
| Accelerated Oven Aging at 136° C. for 7 days | Pass | Fail | Pass |

[1]PVC resin is Georgia Gulf Corporation's 5415 PVC resin
[2]The clay is Burgess Pigment Company's SP-33 clay
[3]Lead stabilizer is Baerlocher's Dythal ®
[4]Topanol CA is 1,1,3-tris(2-methyl-4-hydroxy-5-t-butylphenyl) butane; amounts refer to the total amount of Topanol CA in the formula, arising from both the Topanol CA which could be found in the plasticizer as well as Topanol CA added during formulation.

Experimental details for the results obtained below are as follows.

I. Preparation of flexible PVC compositions

Weigh all ingredients according to the formulation in Table 3. Mix all the dry ingredients for one minute in a Hobart mixer (Model N-50) at speed level 1. Slowly add all liquids. Mix 5 minutes at speed 1.

Transfer this composition to the nip of a two roll mill, which is heated to 170 C. Mill for 5 minutes, with the speed set for 28 rpm. Set the gap for 0.045 inches, remove the fused sheet of plasticized PVC and allow to cool. The plasticized PVC sheet is cut into 6 in by 6 in squares and then molded to specified thickness using a Wabash press (Model 75-184-4 STAC) using a 15 minute 175 C, 1000 psi preheat cycle, followed by a 2 minute at 175 C 3500 psi mold cycle, and then a 15 minute cooling cycle at 5500 psi of platen pressure.

2. Testing of samples, Mechanical Properties

The data reported in Table 4 was developed through the following procedures: All samples were aged for 7 days, at 23 C and at 50 (+/−3)% relative humidity before testing:

| Durometer hardness | ASTM D 2240 |
|---|---|
| Tensile properties on 40 ml samples | ASTM D 882 |
| Clash-Berg Tf temperature | ASTM D 1043 |
| Brittleness Temperature | ASTM D 746 |

3. Accelerated aging performance

Die cut specimens, 0.040 inch thick, were suspended on a rotating sample rack, rotating at 6 rpm, in a forced air oven preset at 136 C. The airflow was adjusted to 150 air changes/hour. After 7 days, the specimens were removed and tested for tensile properties according to ASTM D882.

Oven aging; forced air 7 days at 136° C.; (0.040" thick; die cut specimens); suspend exactly 40 specimens in rack; rotating @ 6 RPM; Volatility: activated carbon; 24 hrs. at 70° C.; D-1203; Method A (0.010"×2" diameter).

Typically, the amount of antioxidant present in the added plasticizer can be about 1.5% by weight. Trimellitate plasticizers typically would have about 0.5–0.6% Topanol CA while DTDP may have 0.30% Topanol CA. Other antioxidants may require more or less depending upon their effectiveness in testing. The level of antioxidant is usually defined around performance targets such as retention of elongation after accelerated aging. In an embodiment of the invention, 0.5 wt % or less, preferably 0.3 wt. % or less, still more preferably 0.2 wt. % or less of antioxidant, based on the weight of the plasticizer, is used. Specific antioxidants which may be useful include bisphenol A, Topanol CA, and Irganox 1046, and the like.

The formulation containing the polyvinyl chloride and the plasticiser according to the present invention, and other phthalate ester plasticizers, may contain other additives. These formulations will contain a stabilizer which counters the effects of aging during process; heat stabilizers reduce the dehydrohalogenation of the polyvinyl chloride at the temperatures at which the formulation is processed and neutralize the hydrochloric acid to prevent that acid from damaging the polymer or the plasticizer any further. Stabilizers, such as benzotriazole and benzophenone, also reduce the degradation by sunlight, ozone and biological agents. The improved ultra-violet stability obtained by the use of the esters of the cyclohexane polycarboxylic acids in place of the corresponding phthalate ester or the trimellitate ester of the present invention and may enable smaller amounts of stabilizers to be used. Typically, the formulations contain from 0.5 to 10 parts, normally from 4 to 7 parts, by weight of stabilizer per 100 parts of the polyvinyl chloride.

Stabilizers to provide stability during heat processing are typically metal compounds, particularly lead salts, which are used in wire and cable applications, organotin, barium, cadmin and zinc salts or calcium/zinc stabilizers. Organic phosphates, stabilizing esters such as epoxidized soy bean oil, and polyols may also be used. Lead stabilizers are used in wire and cable applications especially for those products requiring resistance to high temperature aging. Calcium/zinc stabilizer systems are used in wire and cable, foil and sheeting, wall coverings, medical applications, tubes and footwear, food packaging film and fabric coating. Barium/zinc stabilizer systems are used in foil and sheeting, flooring, wall covering, tubes and footwear and fabric coating. Zinc compounds are frequently used as a stabilizer and as a kicker in formulations used to produce foams in, for example, flooring, wall covering and fabric covering.

Other ingredients which may be added to the polyvinyl chloride formulations include fillers such as calcium carbonate, calcined clay, titanium dioxide or silica. When used, the filler may be present in an amount up to 75 parts per 100 parts of polyvinyl chloride. Lubricants, pigments and processing acids may be included. Other ingredients will be chosen according to the use to which the formulation is to be put. For example, the formulation may contain flame retardants, blowing agents and kickers, bio-stabilizers, secondary plasticizers such as mineral oils or chlorinated paraffins and antioxidants, such as bisphenol A on Topanol CA.

Fillers are incorporated in the formulations primarily to reduce cost, increase the output of dry blending, increase electrical resistance, increase resistance to ultra-violent light, increase hardness, provide improved heat transmission, and to increase the resistance to heat deformation. Fillers can also impart anti-blocking or anti-slip performance. Examples of suitable fillers include calcium carbonate, clays such as alumino-silicates, silica, dolomite and bauxite. The particular particle size distribution and average surface area of the filler will be chosen according to the properties it is desired to impart, as would be apparent to one of skill in the art.

Lubricants and processing aids may be included to reduce the adhesion between polyvinyl chloride and hot machinery surfaces during processing. The lubricants also affect the frictional properties between resin particles during processing. Examples of lubricants include stearic acid and metal stearates which can also act as stabilizers. Other lubricants that may be used include petroleum waxes, silicon oil, mineral oil, synthetic oils and polyethylene waxes.

The formulations may also contain flame retardants to increase ignition time, reduce flame spreading and rate of burning. The flame retardants should have a high decomposition temperature, low volatility, a minimum effect on thermal and mechanical properties and good resistance to light and ultra-violet radiation. Examples of flame retardants that may be used include halogen containing compounds and phosphorous containing organic compounds such as triaryl, trialkyl or alkyl diaryl phosphate esters. Other materials that may be used include chloroparaffins, aluminum trihydrate $Al(OH)_3$, antimony oxides $Sb_2O_3$, or zinc borate.

TABLE 4

PERFORMANCE OF LESS BRANCHED TRIMELLITATE COMPOUNDS

| Physical Properties | Composition A | Composition B | Composition C |
|---|---|---|---|
| Shore A Hardness | 90 | 90 | 90 |
| Shore D Hardness | 42 | 42 | 42 |
| 100% Modulus (N/mm^2) | 14 | 13 | 13 |
| Tensile Strength (N/mm2) | 20 | 20 | 20 |
| Elongation, % | 293 | 298 | 299 |
| Clash-Berg (Tf), ° C. | −19 | −20 | −21 |
| Brittleness (Tb), ° C. | −24 | −24 | −24 |
| Retained Elongation (%),136° C., 7 days | 75 | 57 | 76 |
| Weight Loss (%), 100° C., 7 days | 1.1 | 1.6 | 1.0 |
| Volatility Carbon Black, Wt. Loss, 24 hr., 70° C. | .5 | 0.4 | 0.4 |
| Compound Specific Gravity | 1.320 | 1.317 | 1.317 |

Trade names used herein are indicated by a ™ symbol or ® symbol, indicating that the names may be protected by certain trademark rights, e.g., they may be registered trademarks in various jurisdictions.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims, particularly the following preferred embodiments: (a) a plasticizer ester prepared by esterifying trimellitic anhydride with a less branched $C_{10}$ alcohol molecule having an average of 1.6 or less branches per alcohol molecule, especially the following more preferred embodiments, which may be combined as would be recognized by one of ordinary skill in the art in possession of the present disclosure: the aforementioned ester wherein in the $^1H$ NMR spectrum of said ester, measured in the solvent $CDCl_3$, the ratio of integrated area of the resonance signals with chemical shifts in the range from 1.1 to 3.0 ppm to the integrated area of the resonance signals with chemical shifts in the range of 0.5 to 1.1 ppm is between about 1.0 and about 4.0 ppm, the chemical shift in ppm measured relative to the internal standard TMS; wherein said ester is prepared by esterifying said ester precursor with a less branched $C_{10}$ alcohol having an average of 0.35 to 1.55 branches per alcohol; wherein said ester further has a branching index of less than 18; (b) a composition comprising the plasticizer ester according to any of the aforementioned embodiments, and also particularly wherein said composition further comprises PVC, and/or phthalate esters, and also including more preferred embodiments wherein said composition further comprises trimellitate esters of less branched $C_{10}$ alcohols, wherein greater than 50 mol % of said less branched $C_{10}$ alcohols are 2-propyl-1-heptanol, and/or wherein trimellitate esters of less branched $C_{10}$ alcohols comprise about 10–70 wt. % of the composition, based on the weight of the plasticizer, or even more particularly wherein trimellitate esters of less branched $C_{10}$ alcohols comprises about 30–50-wt. % of the composition, based on the weight of the plasticizer, and/or wherein the trimellitate ester of less branched $C_{10}$ alcohols is prepared by the esterification of trimellitic anhydride with less branched $C_{10}$ alcohols, where the $C_{10}$ alcohols were prepared by the hydroformylation of at least one olefin selected from butene-1, butene-2, and isobutene thereof, using cobalt or rodium containing catalysts followed by dimerization of the hydroformylation C5 aldehydes product through an aldolization process, then hydrogenation and distillation or distillation and hydrogenation; wherein said phthalate esters are selected from the group consisting of at least one species selected from diisodecyl phthalate, diundecyl phthalate, diisotridecyl phthalate, undecyl dodecyl phthalate, di-2-propyl heptyl phthalate, and esters prepared from mixtures of $C_{10}$ to $C_{13}$ alcohols, such as 2-propyl-1-heptanol isotridecyl phthalate and mixtures thereof, and especially wherein said phthalate esters comprises 2-propyl-1-heptanol isotridecyl phthalate, or wherein said less branched $C_{10}$ alcohols have an average of from 0.9 to 1.3 branches per alcohol molecule; and yet still more preferred embodiments wherein said composition further comprises PVC resin, fillers selected from the group consisting of calcium carbonate, calcined clay, and mixtures thereof, at least one stabilizer, including embodiments wherein said stabilizer is a lead stabilizer, wherein said stabilizer is a non-lead stabilizer (particularly wherein said stabilizer comprises at least one mixed metal salts of calcium, barium, or zinc); and (c) an article comprising the aforementioned resin, especially and article comprising electrical wire and insulation, said insulation comprising PVC and a plasticizing system comprising phthalate and trimellitate esters, said insulation meeting the requirements of at least one of the standards set by THHN 90° C., NM-B 90° C., UL 12, UL 83, UL 758, and 105° C. designations according to VDE Specification Code 0207.

What is claimed is:

1. A composition comprising 2-propyl-1-heptyl, isotridecyl phthalate and at least one plasticizer ester prepared by esterifying trimellitic anhydride with a less branched $C_{10}$ alcohol molecule having an average of 1.6 branches or less per alcohol molecule.

2. The composition according to claim 1, prepared by esterifying trimellitic anhydride with a less branched $C_{10}$ alcohol having an average of 0.35 to 1.55 branches per alcohol.

3. The composition according to claim 1, further comprising PVC.

4. The composition according to claim 1, comprising trimellitate esters of less branched $C_{10}$ alcohols, wherein greater than 50 mol % of said less branched $C_{10}$ alcohols are 2-propyl-1-heptanol.

5. The composition according to claim 1, comprising trimellitate esters of less branched $C_{10}$ alcohols in the amount of about 10–70 wt. % based on the weight of the plasticizer.

6. The composition according to claim 1, comprising trimellitate esters of less branched $C_{10}$ alcohols in the amount of about 30–50-wt. % based on the weight of the plasticizer.

7. The composition according to claim 1, comprising trimellitate esters of less branched $C_{10}$ alcohols prepared by the esterification of trimellitic anhydride with less branched C10 alcohols, where the C10 alcohols were prepared by the hydroformylation of at least one olefin selected from butene-1, butene-2, and isobutene thereof, using cobalt or rhodium containing catalysts followed by dimerization of the hydroformylation C5 aldehydes product through an aldolization process, then hydrogenation and distillation or distillation and hydrogenation.

8. The composition according to claim 1, comprising trimellitate esters of less branched $C_{10}$ alcohols wherein said less branched $C_{10}$ alcohols have an average of from 0.9 to 1.3 branches per alcohol molecule.

9. The composition according to claim 1, further comprising PVC resin, fillers selected from the group consisting of calcium carbonate, calcined clay, and mixtures thereof, and at least one stabilizer.

10. The composition according to claim 9, wherein said stabilizer is a lead stabilizer.

11. The composition according to claim 9, wherein said stabilizer is a non-lead stabilizer.

12. The composition according to claim 9, wherein said stabilizer is mixed metal salts of calcium, barium, or zinc.

13. An article comprising the resin composition of claim 1.

14. The article according to claim 13, said article comprising electrical wire and insulation, said insulation comprising said resin composition, said insulation meeting the requirements of at least one of the standards set by THHN 90° C., NM-B 90° C., UL 12, UL 83, UL 758, and 105° C. designations according to VDE Specification Code 0207.

15. A composition comprising phthalate esters and a plasticizer ester prepared by esterifying trimellitic anhydride with a less branched $C_{10}$ alcohol having an average of 0.35 to 1.6 branches per alcohol.

16. The composition according to claim 15, wherein said phthalate esters include at least one selected from the group consisting of diisodecyl phthalate, diundecyl phthalate, diisotridecyl phthalate, undecyl dodecyl phthalate, di-2-propyl heptyl phthalate, and esters prepared from mixtures of $C_{10}$ to $C_{13}$ alcohols.

17. The composition according to claim 16, wherein in the $^1$H NMR spectrum of said plasticizing ester, measured in the solvent $CDCl_3$, the ratio of integrated area of the resonance signals with chemical shifts in the range from 1.1 to 3.0 ppm to the integrated area of the resonance signals with chemical shifts in the range of 0.5 to 1.1 ppm is between about 1.0 and about 4.0 ppm, the chemical shift in ppm measured relative to the internal standard TMS.

18. The composition according to claim 15, further comprising PVC.

19. The composition according to claim 18, wherein said plasticizing ester comprises about 10–70 wt % based on the weight of the plasticizer.

20. The composition according to claim 18, wherein said plasticizing ester comprises about 30–50 wt. % based on the weight of the plasticizer.

21. The composition according to claim 15, wherein said less branched $C_{10}$ alcohols have an average of from 0.9 to 1.3 branches per alcohol molecule.

* * * * *